United States Patent
Cui et al.

(10) Patent No.: US 11,022,461 B2
(45) Date of Patent: Jun. 1, 2021

(54) METHOD AND DEVICE FOR MOBILE ILLUMINATION, AND STORAGE MEDIUM

(71) Applicant: Beijing Xiaomi Mobile Software Co., Ltd., Beijing (CN)

(72) Inventors: Qiqi Cui, Beijing (CN); Yan Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 191 days.

(21) Appl. No.: 16/128,517

(22) Filed: Sep. 12, 2018

(65) Prior Publication Data

US 2019/0101409 A1    Apr. 4, 2019

(30) Foreign Application Priority Data

Sep. 30, 2017   (CN) .......................... 201710923016.3

(51) Int. Cl.
*F21L 2/00*        (2006.01)
*F21L 4/00*        (2006.01)
(Continued)

(52) U.S. Cl.
CPC ....... *G01C 21/3697* (2013.01); *B60Q 1/0023* (2013.01); *B60Q 1/04* (2013.01);
(Continued)

(58) Field of Classification Search
CPC ................................................ F21W 2111/10
See application file for complete search history.

(56) References Cited

U.S. PATENT DOCUMENTS 6,140,957 A * 10/2000 Wilson ................... G01C 15/00
                                                        342/357.32
2010/0191418 A1* 7/2010 Mimeault ............. G01S 17/931
                                                        701/36
(Continued)

FOREIGN PATENT DOCUMENTS

CN        104029628 A      9/2014
CN        204133798 U      2/2015
(Continued)

OTHER PUBLICATIONS

Extended European search report of European Patent Application No. 18197777.8 from the European Patent office, dated Feb. 4, 2019.
(Continued)

*Primary Examiner* — Anshul Sood
(74) *Attorney, Agent, or Firm* — Jun He Law Offices P.C.; James J. Zhu

(57) ABSTRACT

The present disclosure relates to a method and a device for mobile illumination, and a storage medium, which pertains to the technical field of intelligent hardware. The method includes: performing a lighting process through a device for mobile illumination; during the lighting process, acquiring environmental information of a target area to be traveled, the environmental information including at least one of the followings: a number of reflected test signals of a designated number of test signals emitted to the target area, image data of the target area, and map data of the target area, and the target area being any area in front of the device for mobile illumination; and determining whether the target area is unsafe to travel according to the environmental information.

18 Claims, 9 Drawing Sheets

(51) Int. Cl.
  *G01C 21/36*  (2006.01)
  *B60Q 1/00*   (2006.01)
  *B60Q 1/08*   (2006.01)
  *G08B 23/00*  (2006.01)
  *G08B 21/02*  (2006.01)
  *B60Q 9/00*   (2006.01)
  *B60Q 1/04*   (2006.01)
  *B60T 7/12*   (2006.01)
  *B60T 8/17*   (2006.01)
  *F21V 23/00*  (2015.01)
  *G01C 21/34*  (2006.01)
  *F21Y 115/10* (2016.01)
  *F21W 111/10* (2006.01)

(52) U.S. Cl.
  CPC ............... *B60Q 1/085* (2013.01); *B60Q 9/00* (2013.01); *B60T 7/12* (2013.01); *B60T 8/17* (2013.01); *F21L 2/00* (2013.01); *F21L 4/005* (2013.01); *F21V 23/003* (2013.01); *G01C 21/3407* (2013.01); *G01C 21/3691* (2013.01); *G08B 21/02* (2013.01); *G08B 23/00* (2013.01); *B60Q 2300/45* (2013.01); *F21W 2111/10* (2013.01); *F21Y 2115/10* (2016.08)

(56) References Cited

U.S. PATENT DOCUMENTS

2012/0032806 A1    2/2012  Lee
2014/0022369 A1    1/2014  Kwon
2016/0339990 A1*  11/2016  Walthert ................ B62K 25/08

FOREIGN PATENT DOCUMENTS

| | | |
|---|---|---|
| CN | 104822042 A | 8/2015 |
| CN | 106428004 A | 2/2017 |
| CN | 106891888 A | 6/2017 |
| CN | 106899766 A | 6/2017 |
| CN | 107065870 A | 8/2017 |
| DE | 202012100669 U1 | 5/2012 |
| WO | 2008154736 A1 | 12/2008 |

OTHER PUBLICATIONS

The First Office Action in Chinese Patent Application No. 201710923016.3, dated Aug. 28, 2019.

* cited by examiner

METHOD AND DEVICE FOR MOBILE ILLUMINATION, AND STORAGE MEDIUM

CROSS-REFERENCE TO RELATED APPLICATION

This application is based upon and claims priority to Chinese patent application No. 201710923016.3 filed Sep. 30, 2017, which is incorporated herein by reference in its entirety.

TECHNICAL FIELD

The present disclosure relates to the technical field of intelligent hardware, and more particularly, to a method and a device for mobile illumination, and a storage medium.

BACKGROUND

At present, flashlights can meet a variety of lighting needs in daily life of users. For example, during a night out, floor inspection, outdoor mountaineering, etc., a user usually needs a flashlight for lighting due to poor illumination in the surrounding environment.

In actual application, the user can turn on the flashlight and illuminate the road ahead in order to find out the road conditions on the front road to be walked, so as to plan the route to be walked according to the road conditions of the road ahead to ensure the safety of walking.

SUMMARY

In order to overcome the problem existing in the related art, the present disclosure provides a method and a device for mobile illumination, and a storage medium. The technical solution is as follows.

According to a first aspect of the embodiments of the present disclosure, there is provided a method for mobile illumination. The method includes:

performing a lighting process through a device for mobile illumination;

acquiring, during the lighting process, environmental information of a target area to be traveled, the environmental information including at least one of the following: a number of reflected test signals of a designated number of test signals emitted to the target area, image data of the target area, and map data of the target area; and determining whether the target area is unsafe to be traveled according to the environmental information.

According to a second aspect of the embodiments of the present disclosure, there is provided a device for mobile illumination, including:

a processor; and a memory for storing instructions executable by the processor;

wherein the processor is configured to:

perform a lighting process through the device for mobile illumination;

acquire, during the lighting process, environmental information of a target area to be traveled, the environmental information including at least one of the following: a number of reflected test signals of a designated number of test signals emitted to the target area, image data of the target area, and map data of the target area; and determine whether the target area is unsafe to travel according to the environmental information.

According to a third aspect of the embodiments of the present disclosure, there is provided a computer readable storage medium having stored thereon a computer program that, when being executed by a processor, performs the method for mobile illumination according to any one of the implementations of the first aspect.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
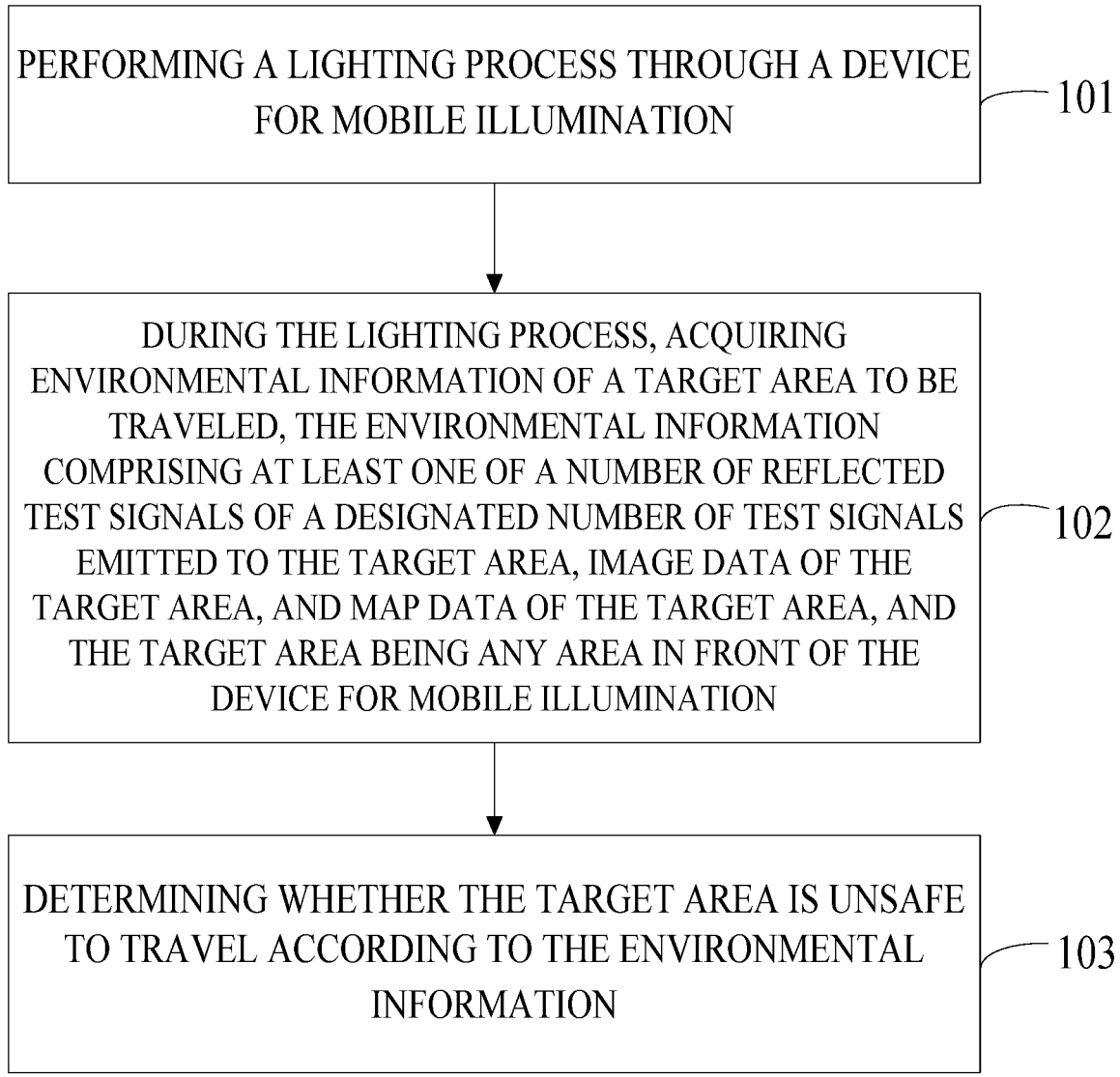
FIG. 1 is a flowchart illustrating a method for mobile illumination according to an exemplary embodiment.

To make the objectives, technical solutions, and advantages of the present disclosure more clear, the embodiments of the present disclosure will be further described in detail below with reference to the accompanying drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the embodiment of the present disclosure, the method for mobile illumination may be applied in a lighting apparatus with a device for mobile illumination. The lighting apparatus with the device for mobile illumination may be an intelligent flashlight, a mobile phone, a tablet computer, a vehicle, an intelligent robot or an intelligent home robot. During the lighting process, the device for mobile illumination can detect whether a target area to be traveled is unsafe to travel.

For example, the lighting apparatus with the device for mobile illumination is an intelligent flashlight, a mobile phone or a tablet computer. While the user uses the lighting apparatus with the device for mobile illumination for lighting, the device for mobile illumination detects whether the target area is unsafe to travel, to ensure the safety of the user during walking.

For another example, the lighting apparatus with a device for mobile illumination is a vehicle, and the device for mobile illumination may be an on-board lighting apparatus of the vehicle. During the process of the driver using the device for mobile illumination for lighting, the device for mobile illumination detects in real time whether a potential safety hazard exists in the front area to be traveled, to ensure the safety of the vehicle during driving.

For another example, the lighting apparatus with the device for mobile illumination is a mobile device such as an intelligent robot or an intelligent home robot. During the movement process of the mobile device, the device for mobile illumination detects whether the target area is unsafe to travel, such that the mobile device can plan a moving route according to the detection result and improve the working efficiency of the mobile device.

It should be noted that an entity for performing the method for mobile illumination may be a device for mobile illumination or a lighting apparatus including the device for mobile illumination. In the embodiment of the present disclosure, only the lighting apparatus will be described as the entity. However, the embodiment of the present disclosure does not limit the entity for performing the method for mobile illumination, and the entity may be any one of the aforementioned devices or may be the lighting apparatus.

FIG. 1 is a flowchart illustrating a method for mobile illumination according to an exemplary embodiment. The entity for performing the method for mobile illumination may be a lighting apparatus. As shown in FIG. 1, the method includes the following steps.

In step 101, a lighting process is performed through the device for mobile illumination.

In step 102, during the lighting process, environmental information of the target area to be traveled is acquired, the environmental information including at least one of the following: a number of reflected test signals of a designated number of test signals emitted to the target area, image data of the target area, and map data of the target area, and the target area to be traveled being any area in front of the device for mobile illumination;

In step 103, it is determined whether the target area is unsafe to travel according to the environmental information.

In one possible implementation, acquiring environmental information of a target area to be traveled includes:

emitting the designated number of test signals to the target area, receiving reflected test signals, and counting the number of the reflected test signals; and/or photographing the target area through a photographing module of the device for mobile illumination, to obtain the image data; and/or acquiring a moving direction and a current position of the device for mobile illumination, and acquiring the map data of the target area according to the moving direction and the current position of the device for mobile illumination.

In one possible implementation, determining whether the target area is unsafe to travel according to the environmental information includes:

when the environmental information includes the number of the reflected test signals, determining a difference between the number of the reflected test signals and the designated number, and when determining that the target area to travel when the difference is greater than a preset threshold;

when the environmental information includes the image data, analyzing the image data to determine whether the target area is a non-travelable area; and determining that the target area to travel when the target area is a non-travelable area; and when the environmental information includes the map data, acquiring, during the lighting process, a road property of the target area from the map data; and determining that the target area is unsafe to travel when the road property indicates that the target area is a non-travelable area.

In one possible implementation, before acquiring environmental information of an target area to be traveled, the method further includes:

acquiring a current mode of the device for mobile illumination; and when the current mode indicates that the device for mobile illumination is used to illuminate the target area in a moving state, performing the step of acquiring environmental information of the target area.

In one possible implementation, the method further includes:

acquiring a current state and an irradiation angle of the device for mobile illumination, the irradiation angle being an angle between illumination light emitted by the device for mobile illumination and a reference plane; and when the current state is a moving state and the irradiation angle is within a preset angle range, determining that the current mode indicates that the device for mobile illumination is used to illuminate the target area in a moving state.

In one possible implementation, the method further includes:

when it is determined that the target area is unsafe to travel, outputting a warning message for warning the user that the target area is unsafe to travel.

In one possible implementation, the method further includes:

when it is determined that the target area is unsafe to travel, determining position information of a hazardous area where a potential safety hazard exists, the position information including a current position of the hazardous area and/or a relative position of the hazardous area to a current position of the device for mobile illumination; and outputting the position information.

In one possible implementation, when the device for mobile illumination is installed in a vehicle, the method further includes:

when it is determined that the target area is unsafe to travel, sending a braking instruction to an on-board terminal of the vehicle, the braking instruction controlling the vehicle to brake.

In the embodiment of the present disclosure, during the lighting process performed by the lighting apparatus through the device for mobile illumination, the lighting apparatus may acquire environmental information of the target area to be traveled, the environmental information including at least one of the following: a number of reflected test signals of a designated number of test signals emitted to the target area, image data of the target area, and map data of the target area, and the target area being any area in front of the device for mobile illumination; and the lighting apparatus may determine whether the target area is unsafe to travel according to the environmental information. It can ensure the safety of the user in the process of mobile illumination, it can realize automatic detection of a potential safety hazard without detection performed by the user himself, and it can improve the efficiency of mobile illumination.

All of the foregoing optional technical solutions may be combined in any manner to form alternative embodiments of the present disclosure, which will not be described repeatedly herein.

Figure 2:
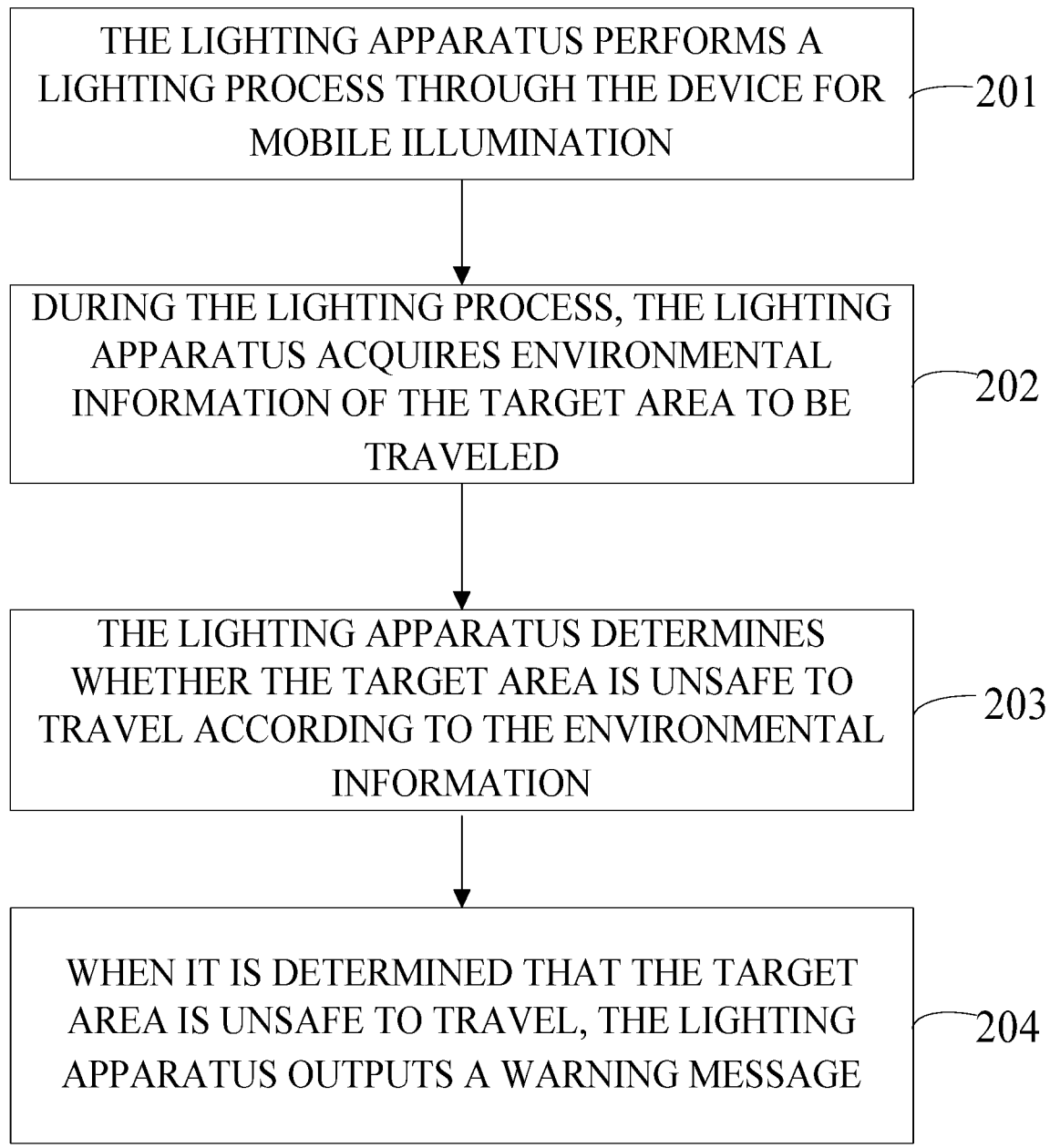
FIG. 2 is a flowchart illustrating a method for mobile illumination according to an exemplary embodiment.

FIG. 2 is a flowchart illustrating a method for mobile illumination according to an exemplary embodiment. The entity for performing the method for mobile illumination may be a lighting apparatus. As shown in FIG. 2, the method includes the following steps.

In step 201, the lighting apparatus performs a lighting process through the device for mobile illumination.

In this step, when the lighting apparatus detects a turning-on instruction, the lighting apparatus turns on the device for mobile illumination for lighting. The lighting apparatus may have a turning-on button, and the user may trigger the turning-on button to turn on the device for mobile illumination. When the lighting apparatus detects that the turning-on button is triggered, the lighting apparatus generates a turning-on instruction. Alternatively, the lighting apparatus may also trigger the lighting apparatus to generate a turning-on instruction through a designated voice signal or a designated vibration operation. The process may include: when the lighting apparatus collects a designated voice signal from the surrounding environment, or the lighting apparatus detects that a designated vibration operation is received, the lighting apparatus generates a turning-on instruction. The designated voice signal or the designated vibration may be set and changed according to actual needs of the user, which is not specifically limited in this embodiment of the disclosure. For example, the designated voice signal may be a voice signal of "lighting", "lighting on" and so on detected by the lighting apparatus, and the designated vibration operation may be a vibration operation when the user shakes the lighting apparatus up and down.

In an embodiment of the present disclosure, in practical application, the device for mobile illumination may set with multiple modes, and different modes may be applied to different application scenarios. When the lighting apparatus turns on the device for mobile illumination and the device for mobile illumination is in a walking mode, the device for mobile illumination is used for lighting during walking. When the device for mobile illumination is in an inspection mode, the device for mobile illumination may be used for lighting for inspecting a certain object. For example, the device for mobile illumination may illuminate the electricity meter in the inspection mode to facilitate the user to repair the electricity meter. Apparently, only when the device for mobile illumination is used to illuminate the target area to be traveled in a moving state, the lighting apparatus may detect the target area. Therefore, before the lighting apparatus detects the target area to, the lighting apparatus may also determine whether to detect the target area based on the current mode of the device for mobile illumination. The process may include that: the lighting apparatus acquires the current mode of the device for mobile illumination; and only when the current mode indicates that the device for mobile illumination is used to illuminate the target area in a moving state, the lighting apparatus performs the following step 202, i.e., the lighting apparatus acquires the environmental information of the target area.

Figure 3:
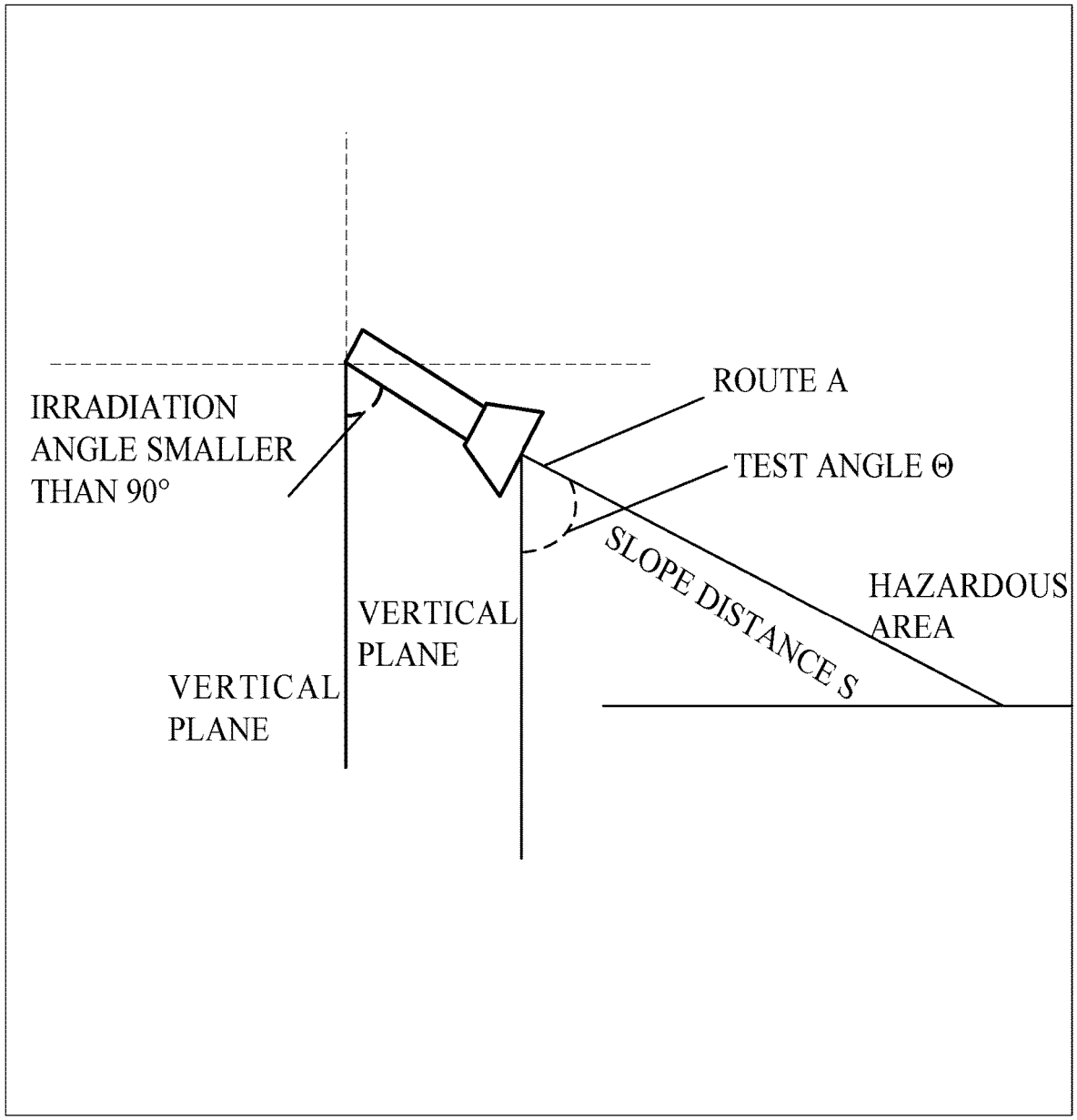
FIG. 3 is a schematic diagram illustrating an irradiation angle according to an exemplary embodiment.

It should be noted that when the device for mobile illumination is in a different mode, the current state of the device for mobile illumination is different, and the corresponding irradiation angle is also different. The irradiation angle is the angle between the illumination light of the device for mobile illumination and a reference plane. A level instrument and a navigation module may be installed in the lighting apparatus. The lighting apparatus acquires the irradiation angle through the level instrument, and acquires the current state of the device for mobile illumination through the navigation module, so as to make the determination based on the current state and the irradiation angle. The determination process may include that: the lighting apparatus acquires the current state and the irradiation angle of the device for mobile illumination; when the current state is a moving state and the irradiation angle is within a preset angle range, the lighting apparatus determines that the current mode indicates that the device for mobile illumination is used to illuminate the target area in a moving state; and when the irradiation angle is not within a preset angle range or the current state is not the moving state, the lighting apparatus determines that the current mode does not indicate that the device for mobile illumination is used to illuminate the target area in a moving state. The reference plane and the preset angle may be set and changed according to actual needs of the user, which is not specifically limited in the embodiment of the present disclosure. The navigation module may include a gyroscope, an accelerometer, and the like. For example, taking an intelligent flashlight as an example of the lighting apparatus, and as shown in FIG. 3, the reference plane may be a vertical plane along a vertically downward direction from the position of the intelligent flashlight, and the preset angle may be 90°. When the angle between the intelligent flashlight and the vertical plane is less than 90°, the current mode of the device for mobile illumination indicates that the device for mobile illumination is used to illuminate the target area in a moving state.

In a possible design, the lighting apparatus may also be provided with a mode button for setting different modes, and the user may set the current mode of the device for mobile illumination by triggering the mode button. There may be one or more mode buttons, and the lighting apparatus may acquire the current mode of the device for mobile illumination through the following two implementations.

For the first implementation, the mode button may be one mode button corresponding to a plurality of different modes, and the user may select a desired mode by triggering the mode button. The lighting apparatus may acquire the current mode of the device for mobile illumination through the following steps. When the lighting apparatus detects that the mode button is triggered, at least one mode corresponding to the mode button is displayed, such that the user may select the desired mode from the at least one mode, and end the selection by triggering a confirmation button; and when the lighting apparatus detects the confirmation button is triggered, the lighting apparatus acquires the mode selected by the user, and uses this selected mode as the current mode of the device for mobile illumination.

For the second implementation, the mode button may also be a plurality of mode buttons. Each mode button corresponds to a different mode. The user may trigger the mode button corresponding to the mode as desired. The lighting apparatus may acquire the current mode of the device for mobile illumination through the following steps. When the lighting apparatus detects that the mode button is triggered, the lighting apparatus acquires the mode corresponding to the triggered mode button from the corresponding relationship between the mode buttons and the modes, and takes the acquired mode as the current mode of the device for mobile illumination.

It should be noted that when the device for mobile illumination is installed in an apparatus (such as a vehicle)

that requires mobile lighting, it may be considered in default that the current state of the device for mobile illumination indicates that the device for mobile illumination is used to light the target area in a moving state. For the apparatus that requires mobile lighting, the device for mobile illumination is generally used for lighting the front area to be traveled while the apparatus is moving, so as to plan a traveling route for the apparatus. Therefore, when the device for mobile illumination is installed in an apparatus that requires mobile lighting, it is considered in default that the current state indicates that the device for mobile illumination is used to illuminate the target area to be traveled in a moving state, and the target area is directly detected through the following steps 202-203, to improve the efficiency of mobile illumination.

In step 202, during the lighting process, the lighting apparatus acquires environmental information of the target area to be traveled.

In an embodiment of the present disclosure, the lighting apparatus detects the target area to be traveled based on the environmental information of the target area. The target area is any area in front of the device for mobile illumination. The environmental information includes at least one of the followings: a number of reflected test signals of a designated number of test signals emitted to the target area, image data of the target area, and map data of the target area. Based on the information included in the environmental information, this step may be implemented through the following three implementations.

For the first implementation, when the environmental information includes a number of reflected test signals of a designated number of test signals emitted to the target area, the environmental information of the target area may be acquired through the following steps. The lighting apparatus emits a designated number of test signals to the target area, receives reflected test signals of the designated number of test signals, and counts the number of the reflected test signals.

In an embodiment of the present disclosure, a plurality of ranging points having ranging functions may be disposed in the lighting apparatus. The lighting apparatus may emit a designated number of test signals to the target area to be traveled through the ranging points, and each ranging point may emit one or more test signals, with each ranging point corresponding to one test route and test signals from different ranging points corresponding to different test routes. For each test signal in the designated number of test signals, when the lighting apparatus emits the test signal according to the test route corresponding to the ranging point, if the test signal meets any object in the target area, it may indicate that the area corresponding to the test route in the target area is an impeded area. The impeded area is generally a travelable area having a road. In this case, the emitted test signal may be reflected back along the test route as emitted, and the reflected test signal is received at the ranging point. On the other hand, in another case, after the test signal is emitted, the test signal reaches no object in the target area, no reflected test signal will be received at the ranging point which emitted the test signal. In this case, it is indicated that no object exists in an area reachable by the test signal along the route as emitted in the target area. That is, the area corresponding to the test route in the target area is an unimpeded area, which is a non-travelable area such as a cliff or a sea surface below the horizontal plane. The lighting apparatus counts the number of the reflected test signals which are received at each ranging point to obtain the number of the reflected test signals of the designated number of test signals.

It should be noted that, in the present disclosure, the reflected test signals may be received through the ranging points, or may be received by other receivers provided on the lighting apparatus (including a terminal provided with a device for mobile illumination, such as a vehicle). For example, receivers are provided around the ranging points of the device for mobile illumination, for receiving the reflected test signals.

Figure 4:
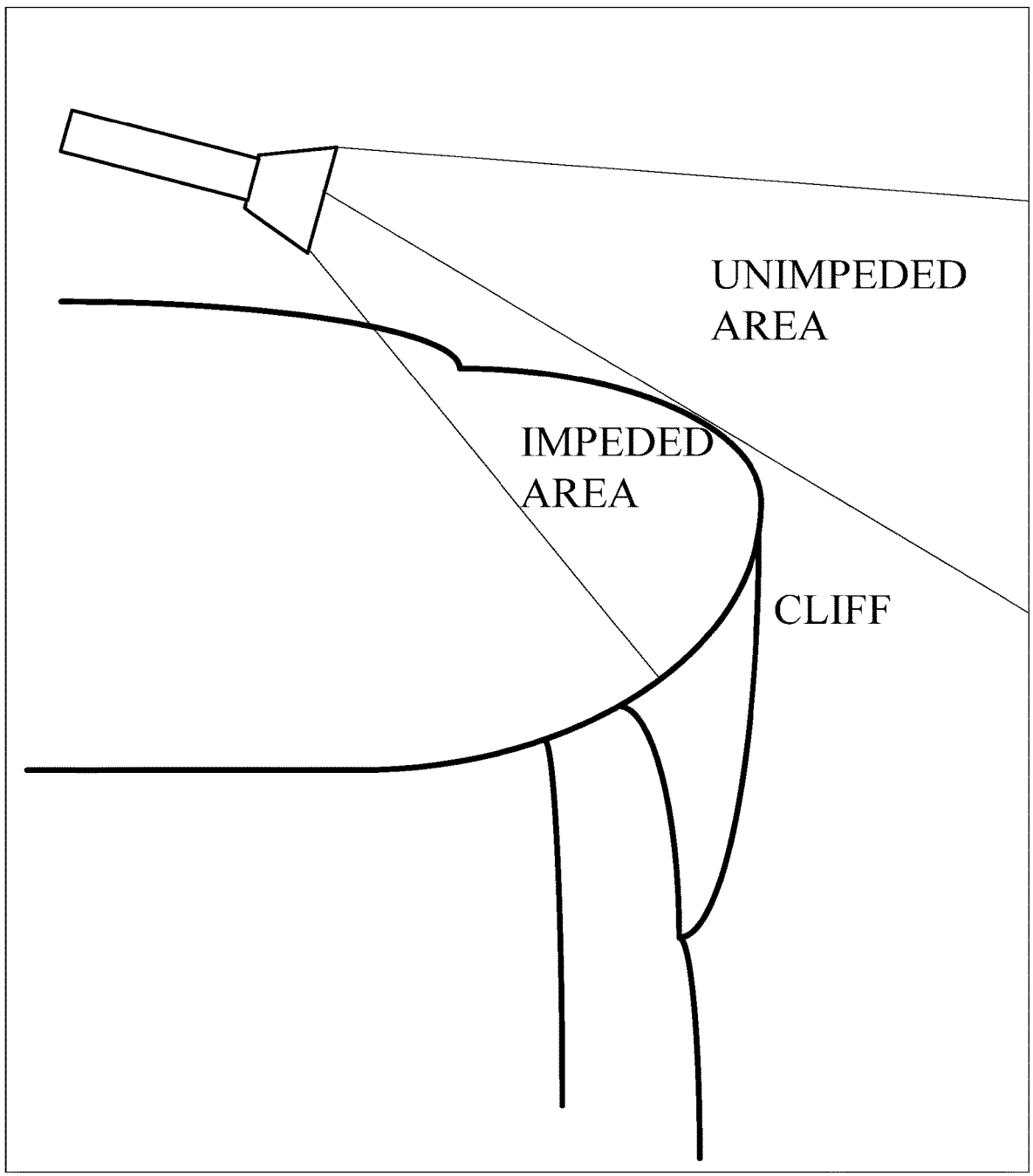
FIG. 4 is a schematic diagram illustrating unimpeded and impeded areas in a target area to be traveled.

As shown in FIG. 4, the lighting apparatus detects that an unimpeded area and an impeded area exist in the target area to be traveled through the test signals emitted. The unimpeded area is an area in the target area, which corresponds to the test route of the test signal not reflected back, and the impeded area is an area in the target area, which corresponds to the test route of the test signals reflected back. Apparently, there is a cliff in the target area.

Figure 5:
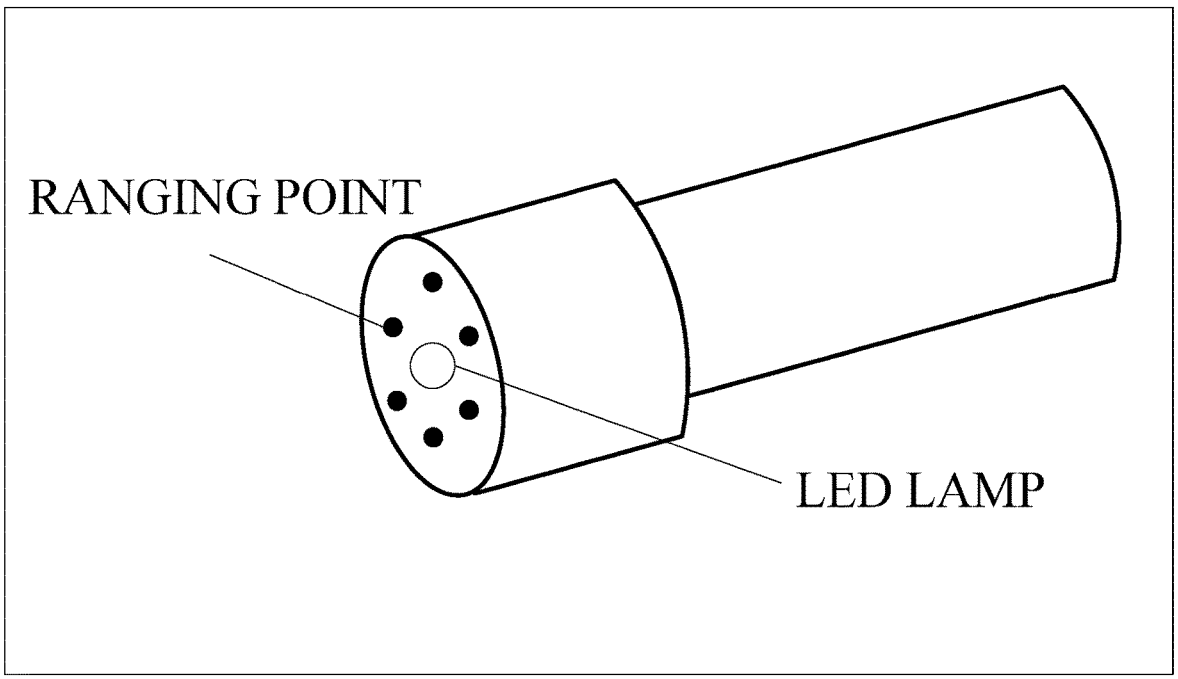
FIG. 5 is schematic diagram illustrating ranging points in an intelligent flashlight according to an exemplary embodiment.

It should be noted that the ranging point may be a ranging point based on a photoelectric ranging function or a ranging point based on an acoustic ranging function. When the ranging point is a ranging point based on a photoelectric ranging function, the ranging point may be a laser ranging sensor or an infrared ranging sensor integrated in the lighting apparatus, and the test signal may be laser or infrared light. When the ranging point is a ranging point based on the acoustic ranging function, the ranging point may be an ultrasonic ranging sensor or a surface acoustic wave sensor integrated in a lighting apparatus, and the test signal may be a sound wave, an ultrasonic wave, or the like. In addition, the position of the ranging point in the lighting apparatus may be set based on the position of the lighting lamp in the lighting apparatus. For example, taking an intelligent flashlight as an example of the lighting apparatus, the front end of the intelligent flashlight is installed with an LED (light emitting diode). As shown in FIG. 5, the plurality of ranging points may be installed at the front end of the LED lamp, or the plurality of ranging points may be evenly distributed around a circumference of a circle centered at the LED lamp and with a designated distance as the radius. The spacing between every two adjacent ranging points is equal.

For the second implementation, when the environmental information includes image data of the target area, the environmental information of the target area may be acquired through the following steps. The lighting apparatus photographs the target area through a photographing module of the device for mobile illumination, to obtain the image data.

In an embodiment of the present disclosure, a photographing module may be installed in the lighting apparatus, and the photographing module may be a camera for collecting image data. The position of the photographing module in the lighting apparatus may be set based on the position of the lighting lamp in the lighting apparatus. Similarly, the photographing module may be installed at any position of the lighting apparatus with a distance from the lighting lamp not more than a first preset distance. When the lighting apparatus illuminates the target area to be traveled with the lighting lamp, photographs the target area through the photographing module positioned with a distance from the lighting lamp not more than the first preset distance, to obtain the image data of the target area.

The first preset distance may be set and changed according to actual needs of the user, which is not specifically limited in this embodiment of the present disclosure. For example, the first preset distance may be 5 cm, 3 cm, or the like.

For the third implementation, when the environmental information includes map data of the target area, the environmental information of the target area may be acquired through the following steps. The lighting apparatus acquires a moving direction and a current position of the device for mobile illumination, and acquires map data of the target area according to the moving direction and the current position.

In an embodiment of the present disclosure, a navigation module may be installed in the lighting apparatus, and the lighting apparatus may acquire the moving direction and the current position of the device for mobile illumination through the navigation module. The lighting apparatus takes the moving direction as the direction to be traveled, and takes the area along the direction to be traveled, the area being an area from the current position with a distance not more than a second preset distance, as the target area. The lighting apparatus acquires an area identifier of the target area, and acquires map data of the target area according to the area identifier of the target area.

It should be noted that, the lighting apparatus may store the map data of the target area in the navigation module in advance, so as to directly search the map data corresponding to the identifier of the target area from the locally stored map data according to the identifier of the target area, and directly obtain the searched map data. The navigation module may include a GPS (Global Positioning System), and the second preset distance may be set and changed according to actual needs of the user, which is not specifically limited in the embodiment of the present disclosure. For example, the second preset distance may be 15 m, 28 m, and the like.

In a possible design, the lighting apparatus may also be provided with a communication module, and the lighting apparatus may communicate with a lighting apparatus or a server that stores map data through the communication module. For example, when the lighting apparatus communicates with a server storing map data, after the lighting apparatus acquires the area identifier of the target area to be traveled through the above manners, the lighting apparatus sends an acquisition instruction to the server through the communication module. The acquisition instruction carries the area identifier of the target area. The server receives the acquisition instruction, searches the map data corresponding to the area identifier contained in the acquisition instruction from the map data, and sends the retrieved map data to the lighting apparatus. The lighting apparatus receives the map data sent by the server and takes the map data as the map data of the area to be traveled.

It should be noted that the environmental information may include any one, any two or all the three of a number of reflected test signals of a designated number of test signals emitted to the target area, image data of the target area, and map data of the target area, and the lighting apparatus may acquire any type of the environmental information corresponding to any one of the above three implementations.

In step 203, the lighting apparatus determines whether the target area is unsafe to travel according to the environmental information.

In an embodiment of the present disclosure, based on the different information included in the environmental information, the lighting apparatus may detect the target area according to the environmental information through the following three implementations.

For the first implementation, when the environmental information includes the number of reflected test signals of the designated number of test signals emitted to the target area, this step may include that: the lighting apparatus determines a difference between the number of the reflected test signals and the designated number. When the difference is greater than a preset threshold, the lighting apparatus determines that the target area is unsafe to travel. When the difference is not greater than the preset threshold, the lighting apparatus determines that the target area is safe to travel.

In this step, after the lighting apparatus sends a test signal through the ranging point, the test route of the test signal that is not reflected back corresponds to an unimpeded area in the target area, and the test route of the reflected test signal corresponds to an impeded area in the target area. Thus, in order to avoid environmental errors, the lighting apparatus calculates the difference between the number of the reflected test signals and the designated number. When the difference is greater than the preset threshold, it indicates that there is an unimpeded area in the target area, i.e., the lighting apparatus determines that the target area is unsafe to travel. When the difference is not greater than the preset threshold, it indicates that there is no unimpeded area in the target area, i.e., the lighting apparatus determines that the target area is unsafe to travel.

The preset threshold may be set and changed according to actual needs of the user. For example, the setting of the preset threshold may be based on the moving speed of the lighting apparatus, the type of the ranging signal, the angle between the light emitting direction of the device for mobile illumination and the ground, etc., which is not specifically limited in this embodiment of the disclosure. For example, the preset threshold may be 1, 3, or the like.

For the second implementation, when the environmental information includes image data of the target area, this step may include that: the lighting apparatus analyzes the image data to determine whether the target area is a non-travelable area; when the target area is the non-travelable area, it is determined that the target area is unsafe to travel; and when the target area is a travelable area, it is determined that the target area is unsafe to travel.

The lighting apparatus analyzes the image data to extract a road property of the target area. When the road property is corresponding to non-travelable property, it is determined that the target area is a non-travelable area; and when the road property is corresponding to travelable property, it is determined that the target area is a travelable area. The non-travelable road property includes a road obstacle, road construction, a cliff, and a lake, etc.

In this step, the lighting apparatus performs image recognition on the image data of the area to be treated through a preset recognition algorithm, to identify whether there is an obstacle in the target area, and whether there is an unimpeded area in the target area. When there is an obstacle or an unimpeded area in the target area, the lighting apparatus determines that the target area has a non-travelable road property, i.e., the lighting apparatus determines that the target area is unsafe to travel. When there is no obstacle or unimpeded area in the target area, the lighting apparatus determines that the target area has a travelable road property, i.e., the lighting apparatus determines that the target area is safe to travel.

The preset recognition algorithm may be set and changed according to the actual needs of the user, which is not specifically limited in this embodiment of the disclosure. For example, the preset recognition algorithm may be an image local feature point detection algorithm, a feature matching algorithm, and the like.

For the third implementation, when the environmental information includes map data of the target area, this step may include that: the lighting apparatus acquires the road property of the target area from the map data. When the road property indicates that the target area is a non-travelable area, it is determined that the target area is unsafe to travel; and when the road property indicates that the target area is a travelable area, it is determined that the target area is safe to travel.

In this step, the map data includes at least a correspondence between the area identifier and the road property. The road property is used to indicate whether the road is a travelable area or a non-travelable area, and the lighting apparatus acquires from the map data the road property of the target area based on the area identifier of the target area. When the road property is a non-travelable road property, it is determined that the target area is a non-travelable area; and when the road property is a travelable road property, it is determined that the target area is a travelable area.

The area identifier may be set and changed according to the actual needs of the user, which is not specifically limited in this embodiment of the disclosure. For example, the area identifier may be the name or latitude-longitude coordinates of the target area.

It should be noted that when the environmental information includes the number of reflected test signals of the designated number of test signals emitted to the target area, and also includes image data and/or map data of the target area, the lighting apparatus may first determine whether an unimpeded area exists in the target area based on the number of the reflected test signals. When it is determined that an unimpeded area exists in the target area, the lighting apparatus directly determines that the target area is unsafe to travel. When no unimpeded area exists in the target area, the lighting apparatus then determines whether the target area is safe to travel according to the image data and/or the map data. The implementation of detecting based on the number of the reflected test signals and the implementation of detecting according to the image data and/or the map data are consistent with the foregoing implementations, which are not described herein again.

In step 204, when it is determined that the target area is unsafe to travel, the lighting apparatus outputs a warning message.

In an embodiment of the present disclosure, the warning message is used to warn the user that the target area is unsafe to travel. The warning message is any one of a warning light, a voice warning message, or a vibration warning message. For example, the warning light may be a light that blinks with a preset frequency, wherein the warning light is emitted by the lighting lamp under control of the lighting apparatus. Alternatively, the warning light may also be a light of a designated color, wherein the warning light is emitted by the lighting lamp under control of the lighting apparatus. The color of the designated light and the current light are not the same. The voice warning message may be a voice such as "the front road surface is abnormal, please pay attention to safety", and "danger ahead, no admittance", wherein the voice is emitted by the lighting apparatus through a voice output module. The vibration warning message may be the vibration generated by the lighting apparatus through the vibration motor in the lighting apparatus.

In an embodiment of the present disclosure, when the lighting apparatus detects that the target area is unsafe to travel, the lighting apparatus may also warn the user through the above warning message, such that the user may timely avoid a hazardous area, where a potential safety hazard exists, in the target area, to ensure the safety of the user during walking.

In a possible design, the lighting apparatus may also determine the position information of the hazardous area and inform the user such that the user may accurately avoid the hazardous area. The process may include that: when it is determined that the target area is unsafe to travel, the lighting apparatus determines position information of the hazardous area where the potential safety hazard exists, and outputs the position information.

The position information includes the current position of the hazardous area and/or the relative position of the hazardous area to the current position of the device for mobile illumination, and the step of the lighting apparatus determining the position information of the hazardous area may include that: the lighting apparatus acquires the emitting time and receiving time of at least one reflected test signal; for each reflected test signal, the lighting apparatus calculates a slope distance between the current position of the lighting apparatus and the current position of the hazardous area according to the emitting time, the receiving time and the propagation speed of the test signal, and acquires a test angle of a test route corresponding to the test signal, and the angle may be an angle between the test route and the reference plane; and the lighting apparatus calculates a horizontal distance in a horizontal direction between the current position of the lighting apparatus and the current position of the hazardous area according to the slope distance and the test angle of the moving lighting apparatus, so as to obtain a plurality of horizontal distances. The lighting apparatus generates the position information of the hazardous area in which the potential safety hazard exists according to the plurality of horizontal distances.

It should be noted that the position information may be a numerical value or a numerical range. When the position information is a numerical value, the lighting apparatus may acquire the minimum value of the plurality of horizontal distances, and take the minimum value as the position information of the hazardous area where the potential safety hazard exists. When the position information is a numerical range, the lighting apparatus may acquire the minimum and maximum values of the plurality of horizontal distances, and takes the numerical range composed of the minimum value and the maximum value as the position information of the hazardous area where the potential safety hazard exists.

Herein, taking an intelligent flashlight as an example of the lighting apparatus, if the minimum value of the plurality of horizontal distances is taken as the position information of the hazardous area where the potential safety hazard exists, as shown in FIG. 3, when a potential safety hazard exists in the target area, the minimum value of the plurality of horizontal distances corresponds to the test route a of the test signal, the slope distance between the hazardous area where the potential safety hazard exists and the current position of the lighting apparatus may be a slope distance S between the intelligent flashlight and the hazardous area, and the test angle may be the angle θ between the test route a of the test signal and the vertical plane. Accordingly, the position information is S*sin 0.

It should be noted that when the device for mobile illumination is installed in a vehicle, when it is determined that the target area is unsafe to travel, the lighting apparatus may also send a braking instruction to the on-board lighting apparatus of the vehicle. The braking instruction is used to control the vehicle to brake. The on-board lighting apparatus receives the braking instruction and controls the engine of the vehicle to stop operating, such that the vehicle is decelerated or stopped, thereby ensuring the safety of the driver during driving.

In the embodiment of the present disclosure, during the process of the lighting apparatus performing lighting through the device for mobile illumination, the lighting apparatus may acquire environmental information of the target area to be traveled, the environmental information including at least one of the followings: a number of reflected test signals of a designated number of test signals emitted to the target area, image data of the target area, and map data of the target area, and the target area being any area in front of the device for mobile illumination; and the lighting apparatus may determine whether the target area is unsafe to travel according to the environmental information. It can ensure the safety of the user in the process of mobile illumination, it can realize automatic detection of the potential safety hazard without detection performed by the user himself, and it can improve the efficiency of mobile illumination.

Figure 6:
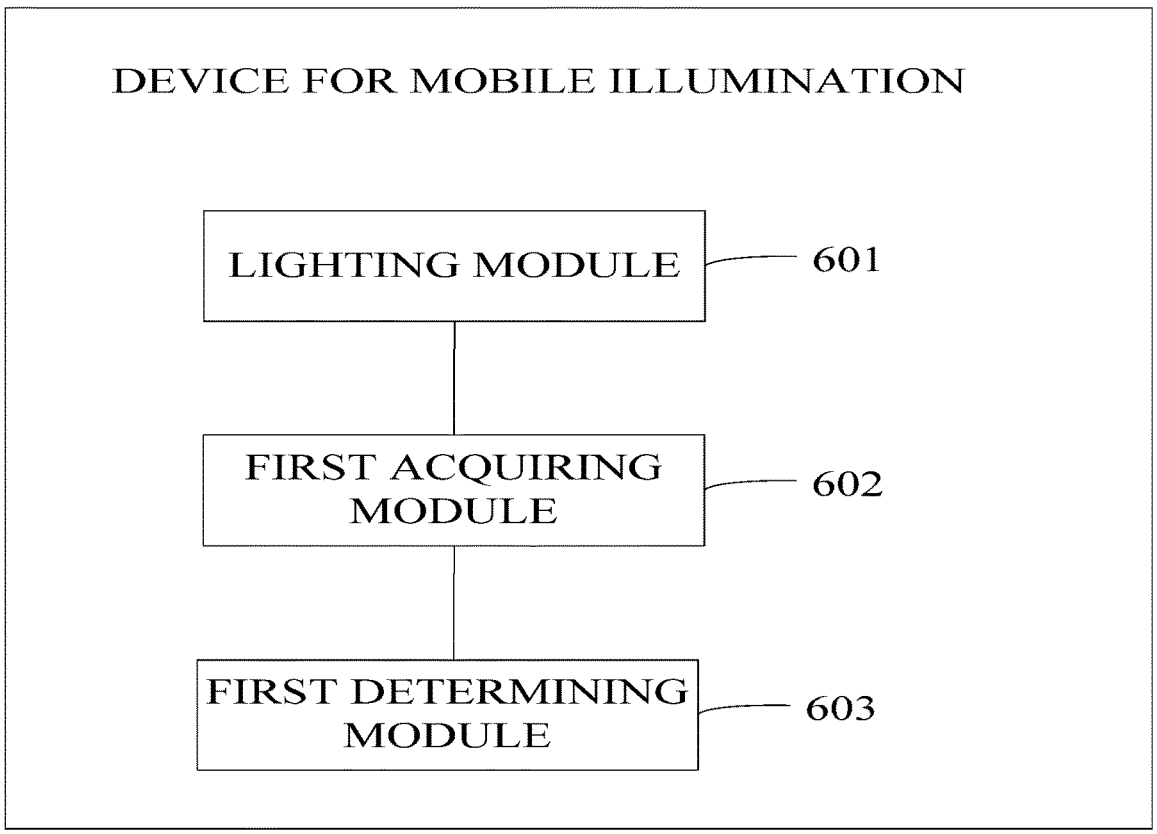
FIG. 6 is a block diagram illustrating a device for mobile illumination according to an exemplary embodiment.

FIG. 6 is a block diagram illustrating a device for mobile illumination according to an exemplary embodiment. Referring to FIG. 6, the device includes: a lighting module 601, a first acquiring module 602 and a first determining module 603.

The lighting module 601 is configured to perform a lighting process through the device for mobile illumination.

The first acquiring module 602 is configured to, during the lighting process, acquire environmental information of a target area to be traveled, the environmental information including at least one of the followings: a number of reflected test signals of a designated number of test signals emitted to the target area, image data of the target area, and map data of the target area, and the target area being any area in front of the device for mobile illumination.

The first determining module 603 is configured to determine whether the target area is unsafe to travel according to the environmental information.

In one possible implementation, the first acquiring module 602 is further configured to emit the designated number of test signals to the target area, receive reflected test signals of the designated number of test signals, and count the number of the reflected test signals; and/or photograph the target area through a photographing module of the device for mobile illumination, to obtain the image data; and/or acquire a moving direction and a current position of the device for mobile illumination, and acquire map data of the target area according to the moving direction and the current position.

In one possible implementation, the first determining module 603 is further configured to, when the environmental information includes the number of reflected test signals, determine a difference between the number of the reflected test signals and the designated number, and when the difference is greater than a preset threshold, determine that the target area is unsafe to travel.

The first determining module 603 is further configured to, when the environmental information includes the image data, analyze the image data to determine whether the target area is a non-travelable area; and when the target area is a non-travelable area, determine that the target area is unsafe to travel.

The first determining module 603 is further configured to, when the environmental information includes the map data of the target area, acquire a road property of the target area from the map data; and when the road property indicates that the target area to is a non-travelable area, determine that the target area is unsafe to travel.

Figure 7:
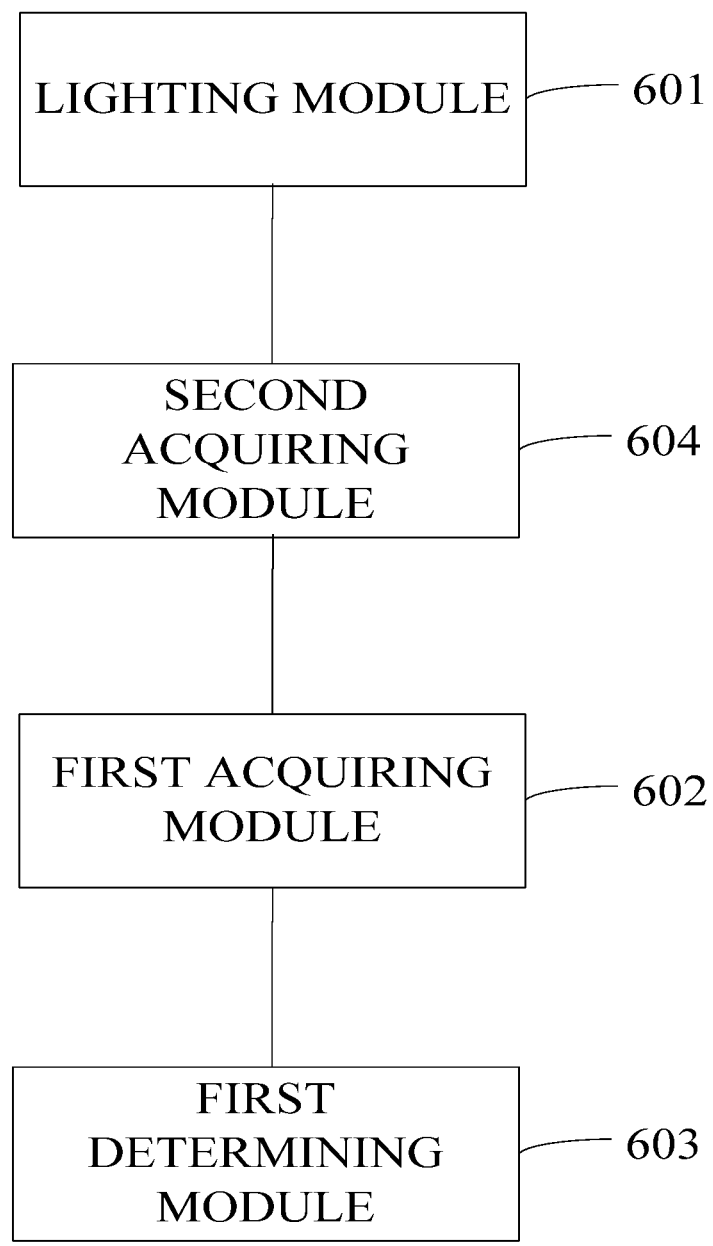
FIG. 7 is a block diagram illustrating a device for mobile illumination according to an exemplary embodiment.

In one possible implementation, referring to FIG. 7, the device further includes a second acquiring module 604.

The second acquiring module 604 is configured to acquire a current mode of the device for mobile illumination.

When the current mode indicates that the device for mobile illumination is used to illuminate the target area in a moving state, the first acquiring module 602 is further configured to acquire environmental information of the target area.

In one possible implementation, the second acquiring module 604 is further configured to acquire a current state and an irradiation angle of the device for mobile illumination, the irradiation angle being an angle between illumination light of the device for mobile illumination and a reference plane; and when the current state is a moving state and the irradiation angle is within a preset angle range, determine that the current mode indicates that the device for mobile illumination is used to illuminate the target area in a moving state.

Figure 8:
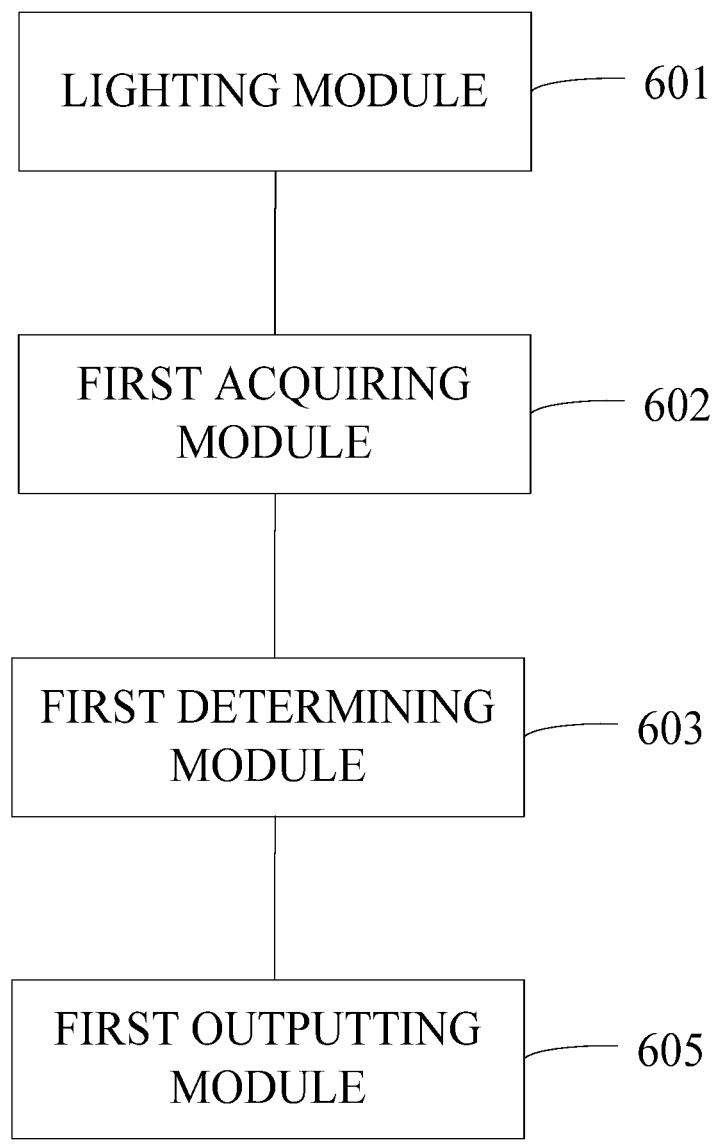
FIG. 8 is a block diagram illustrating a device for mobile illumination according to an exemplary embodiment.

In one possible implementation, referring to FIG. 8, the device further includes a first outputting module 605.

The first outputting module 605 is configured to, when it is determined the target area is unsafe to travel, output a warning message for warning the user that the target area is unsafe to travel.

Figure 9:
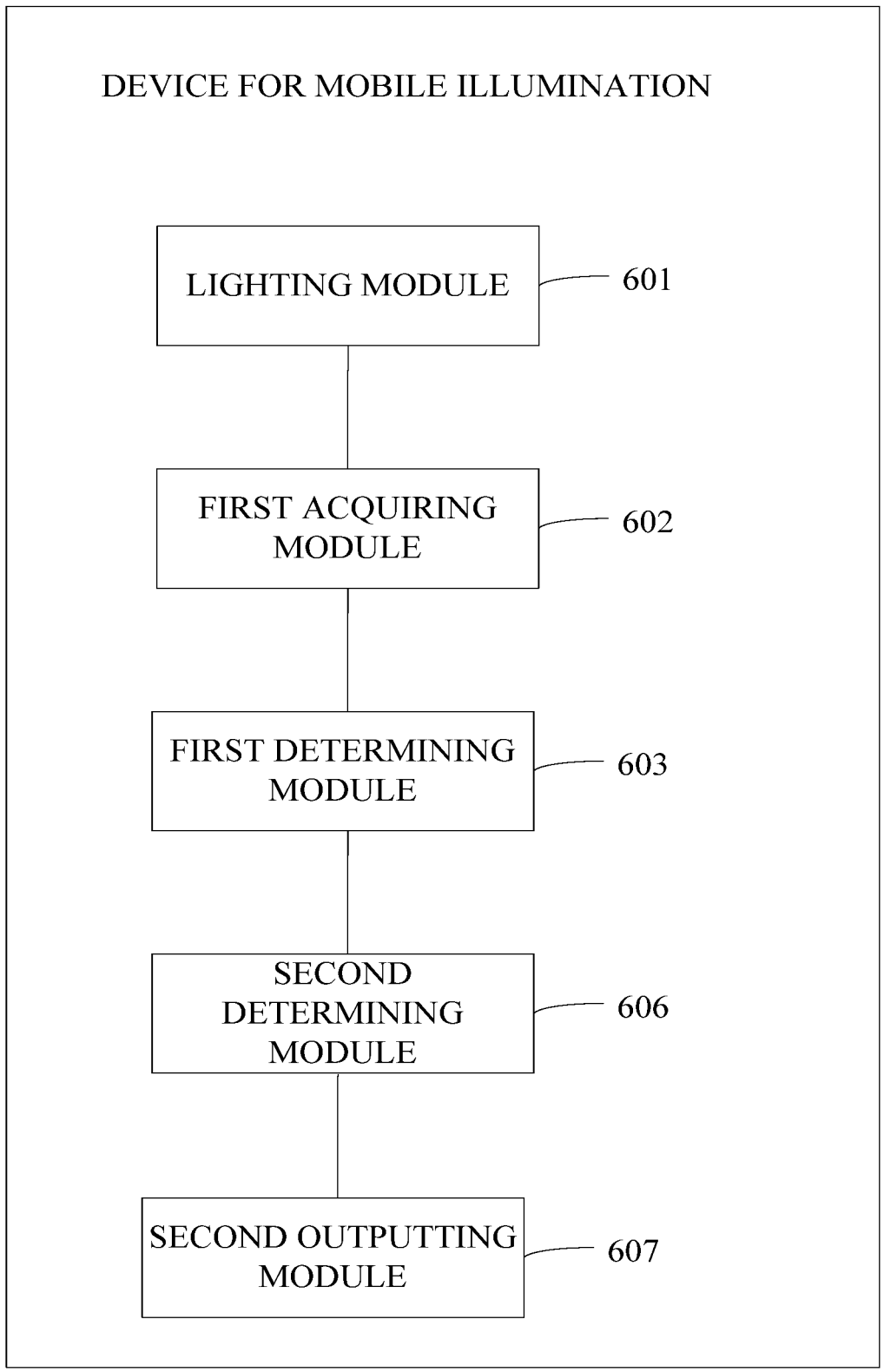
FIG. 9 is a block diagram illustrating a device for mobile illumination according to an exemplary embodiment.

In one possible implementation, referring to FIG. 9, the device further includes: a second determining module 606 and a second outputting module 607.

The second determining module 606 is configured to, when it is determined that the target area is unsafe to travel, determine position information of a hazardous area where a potential safety hazard exists, the position information including a current position of the hazardous area and/or a relative position of the hazardous area to a current position of the device for mobile illumination.

The second outputting module 607 is configured to output the position information.

In one possible implementation, when the device for mobile illumination is installed in a vehicle, the device further includes a sending module 608.

The sending module 608 is configured to, when it is determined that the target area is unsafe to travel, send a braking instruction to an on-board lighting apparatus of the vehicle, the braking instruction controlling the vehicle to brake.

In the embodiment of the present disclosure, during the process of the lighting apparatus performing the lighting process through the device for mobile illumination, the lighting apparatus may acquire environmental information of the target area to be traveled, the environmental information including at least one of the followings: a number of reflected test signals of a designated number of test signals emitted to the target area, image data of the target area, and map data of the target area, and the target area to be traveled being any area in front of the device for mobile illumination; and the lighting apparatus may determine whether the target area is unsafe to travel according to the environmental information. It can ensure the safety of the user in the process of mobile illumination, it can realize automatic detection of the potential safety hazard without detection performed by the user himself, and it can improve the efficiency of mobile illumination.

All of the foregoing optional technical solutions may be combined in any way to form alternative embodiments of the present disclosure, which will not be described repeatedly herein.

It should be noted that the device for mobile illumination provided in the above embodiment only illustrates an example division of the above functional modules during mobile illumination. In practical application, the above functions may be distributed by different functional modules as desired. The internal structure of the device is divided into different functional modules to complete all or some of the functions described above. In addition, in the above embodiments, the device for mobile illumination belongs to the same concept as that of the method for mobile illumination. The specific implementation process of the device is described in detail in the method embodiments, and will not be repeated herein.

Figure 10:
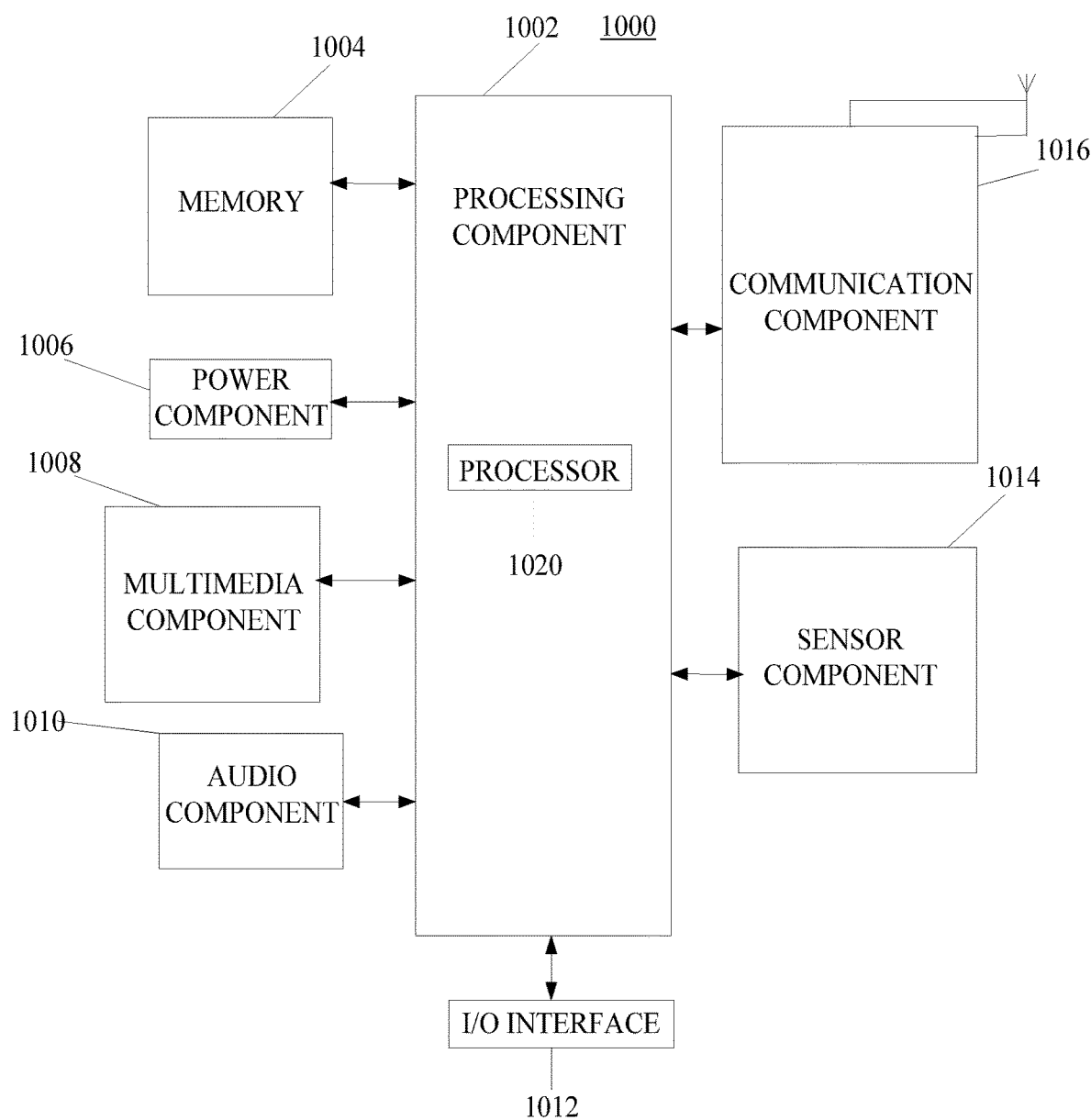
FIG. 10 is a block diagram illustrating a device for mobile illumination according to an exemplary embodiment.

FIG. 10 is a block diagram illustrating a device 1000 for mobile illumination according to an exemplary embodiment. For example, the device 1000 may be a mobile phone, a computer, a digital broadcast terminal, a messaging device, a gaming console, a tablet, a medical device, exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive external multimedia data while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an on/off status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for mobile illumination.

In exemplary embodiments, there is also provided a non-transitory computer-readable storage medium including instructions, such as included in the memory 1004, executable by the processor 1020 in the device 1000, for performing the above described method for mobile illumination. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for mobile illumination, comprising:
   triggering a device for mobile illumination to perform a lighting process to illuminate a target area to be traveled;
   acquiring a current mode of the device for mobile illumination after triggering the device for mobile illumination;
   acquiring, during the lighting process, environmental information of the target area to be traveled in response to that the current mode indicates that the device for mobile illumination is used to illuminate the target area in a moving state, wherein the environmental information comprises at least one of the following: a number of reflected test signals of a designated number of test signals emitted to the target area, image data of the target area, and map data of the target area; and
   determining whether the target area is unsafe to travel according to the environmental information.

2. The method according to claim 1, wherein acquiring, during the lighting process, environmental information of a target area to be traveled comprises:
   emitting the designated number of test signals to the target area, receiving the reflected test signals, and counting the number of the reflected test signals;
   photographing the target area through a photographing module of the device for mobile illumination to obtain the image data; and/or
   acquiring a moving direction and a current position of the device for mobile illumination, and acquiring the map data of the target area according to the moving direction and the current position of the device for mobile illumination.

3. The method according to claim 1, wherein determining whether the target area is unsafe to travel according to the environmental information comprises:
   when the environmental information comprises the number of the reflected test signals, determining a difference between the number of the reflected test signals and the designated number, and determining that the target area is unsafe to travel when the difference is greater than a preset threshold;
   when the environmental information comprises the image data, analyzing the image data to determine whether the target area is a non-travelable area, and determining that the target area is unsafe to travel when the target area is a non-travelable area; and
   when the environmental information comprises the map data, acquiring, during the lighting process, a road property of the target area from the map data, and determining that the target area is unsafe to travel when the road property indicates that the target area is a non-travelable area.

4. The method according to claim 1, further comprising:
   acquiring a current state and an irradiation angle of the device for mobile illumination, wherein the irradiation angle is an angle between illumination light emitted by the device for mobile illumination and a reference plane; and
   determining that the current mode indicates that the device for mobile illumination is used to illuminate the target area in a moving state, when the current state is a moving state and the irradiation angle is within a preset angle range.

5. The method according to claim 1, further comprising:
   outputting a warning message for warning the user that the target area is unsafe to travel when it is determined that the target area is unsafe to travel.

6. The method according to claim 1, further comprising:
   determining position information of a hazardous area where a potential safety hazard exists when it is determined that the target area is unsafe to travel, wherein the position information comprises a current position of the hazardous area and/or a relative position of the hazardous area to a current position of the device for mobile illumination; and
   outputting the position information.

7. The method according to claim 1, wherein when the device for mobile illumination is installed in a vehicle, the method further comprises:
   sending a braking instruction to an on-board terminal of the vehicle when it is determined that the target area is unsafe to travel, wherein the braking instruction controls the vehicle to brake.

8. A device for mobile illumination, comprising:
   a processor; and
   a memory for storing instructions executable by the processor;
   wherein the processor is configured to:
   trigger the device for mobile illumination to perform a lighting process to illuminate a target area to be traveled;
   acquire a current mode of the device for mobile illumination after triggering the device for mobile illumination;
   acquire, during the lighting process, environmental information of the target area to be traveled in response to that the current mode indicates that the device for mobile illumination is used to illuminate the target area in a moving state, wherein the environmental information comprises at least one of the following: a number of reflected test signals of a designated number of test signals emitted to the target area, image data of the target area, and map data of the target area; and
   determine whether the target area is unsafe to travel according to the environmental information.

9. The device according to claim 8, wherein the processor is further configured such that acquiring, during the lighting process, environmental information of a target area to be traveled comprises:
- emitting the designated number of test signals to the target area, receiving the reflected test signals, and counting the number of the reflected test signals;
- photographing the target area through a photographing module of the device for mobile illumination, to obtain the image data; and/or
- acquiring a moving direction and a current position of the device for mobile illumination, and acquiring the map data of the target area according to the moving direction and the current position of the device for mobile illumination.

10. The device according to claim 8, wherein the processor is further configured such that determining whether the target area is unsafe to travel according to the environmental information comprises:
- when the environmental information comprises the number of the reflected test signals, determining a difference between the number of the reflected test signals and the designated number, and determining that the target area is unsafe to travel, when the difference is greater than a preset threshold;
- when the environmental information comprises the image data, analyzing the image data to determine whether the target area is a non-travelable area, and determining that the target area is unsafe to travel when the target area is a non-travelable area; and
- when the environmental information comprises the map data, acquiring, during the lighting process, a road property of the target area from the map data, and determining that the target area is unsafe to travel when the road property indicates that the target area is a non-travelable area.

11. The device according to claim 8, wherein the processor is further configured to:
- acquire a current state and an irradiation angle of the device for mobile illumination, wherein the irradiation angle is an angle between illumination light emitted by the device for mobile illumination and a reference plane; and
- determine that the current mode indicates that the device for mobile illumination is used to illuminate the target area in a moving state, when the current state is a moving state and the irradiation angle is within a preset angle range.

12. The device according to claim 8, wherein the processor is further configured to:
- output a warning message for warning the user that the target area is unsafe to travel when it is determined that the target area is unsafe to travel.

13. The device according to claim 8, wherein the processor is further configured to:
- determine position information of a hazardous area where a potential safety hazard exists when it is determined that the target area is unsafe to travel, wherein the position information comprises a current position of the hazardous area and/or a relative position of the hazardous area to a current position of the device for mobile illumination; and
- output the position information.

14. The device according to claim 8, wherein when the device for mobile illumination is installed in a vehicle, the processor is further configured to:
- send a braking instruction to an on-board terminal of the vehicle when it is determined that the target area is unsafe to travel, wherein the braking instruction controls the vehicle to brake.

15. A non-transitory computer readable storage medium having stored thereon a computer program that, when being executed by a processor, performs the method for mobile illumination according to claim 1.

16. The non-transitory computer readable storage medium according to claim 15, wherein when being executed by the processor, the computer program further performs the method for mobile illumination according to claim 2.

17. The non-transitory computer readable storage medium according to claim 15, wherein when being executed by the processor, the computer program further performs the method for mobile illumination according to claim 3.

18. The non-transitory computer readable storage medium according to claim 15, wherein when being executed by the processor, the computer program further performs the method for mobile illumination according to claim 4.

* * * * *